Oct. 6, 1959   F. R. WILSON   2,907,370
FLARING TOOL WITH AUTOMATIC GAUGING MEANS
Filed Oct. 5, 1953   2 Sheets-Sheet 1
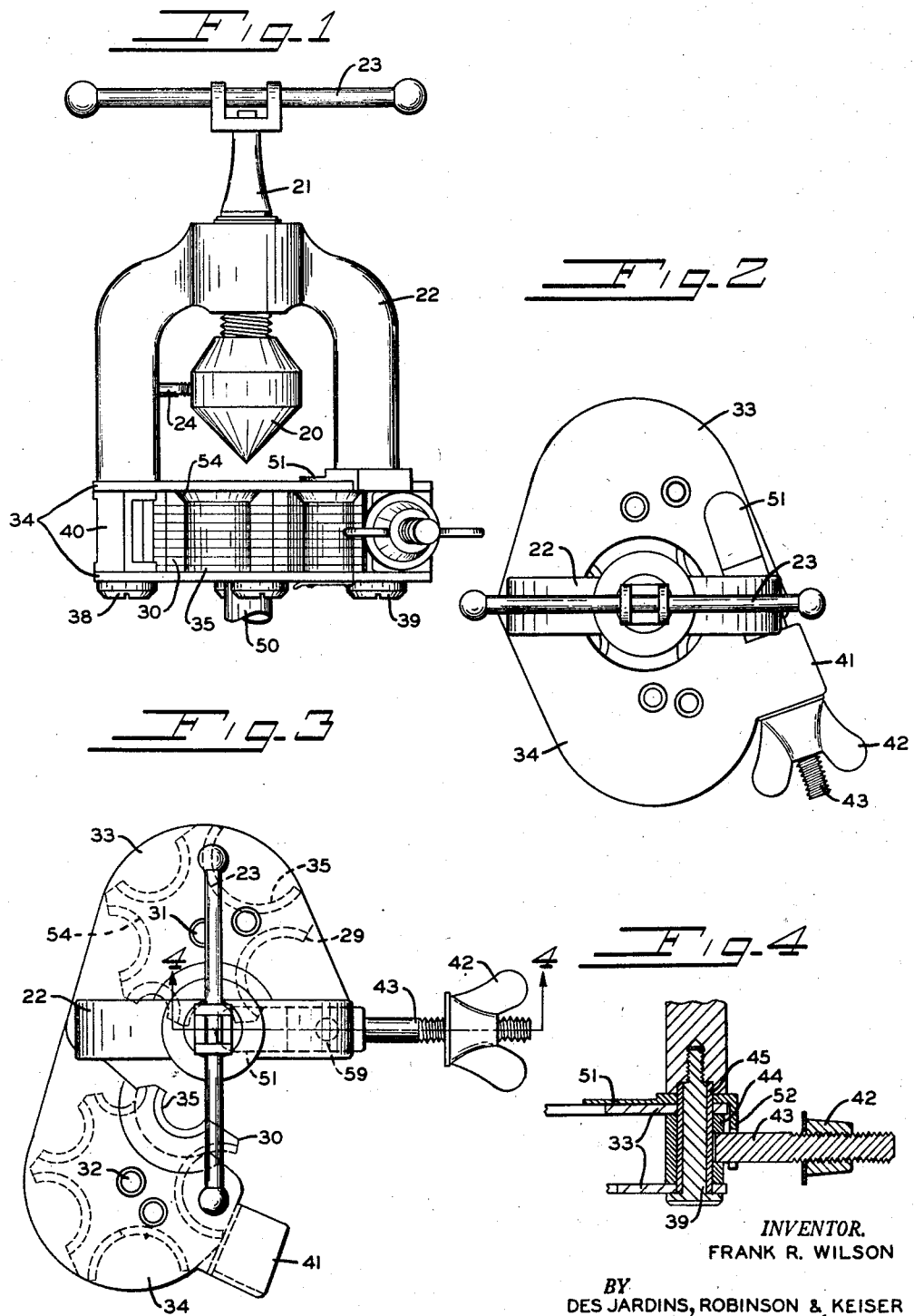
INVENTOR.
FRANK R. WILSON
BY
DES JARDINS, ROBINSON & KEISER
HIS ATTORNEYS Oct. 6, 1959  F. R. WILSON  2,907,370
FLARING TOOL WITH AUTOMATIC GAUGING MEANS
Filed Oct. 5, 1953  2 Sheets-Sheet 2
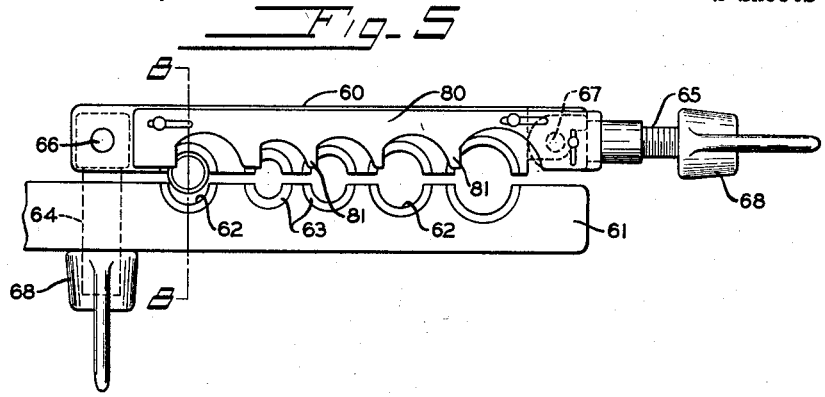
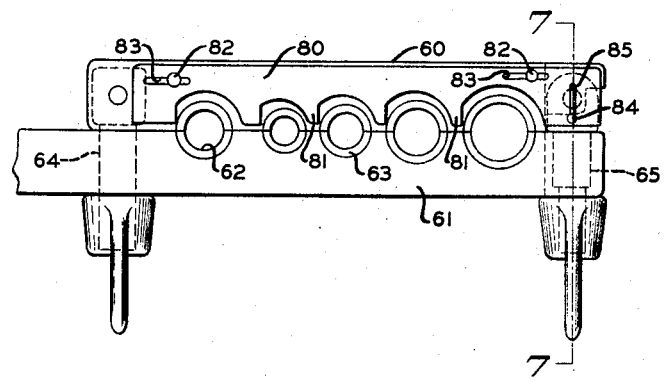
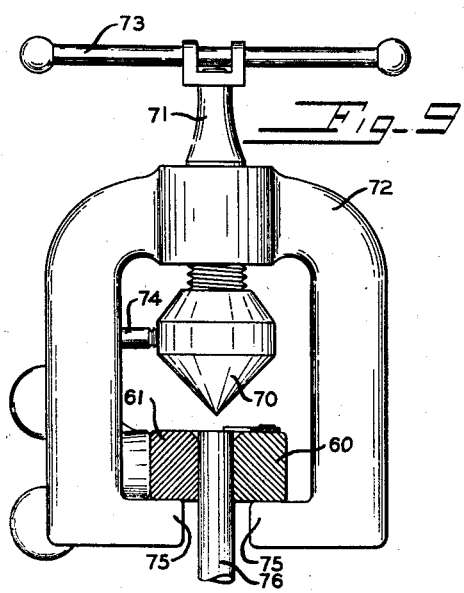
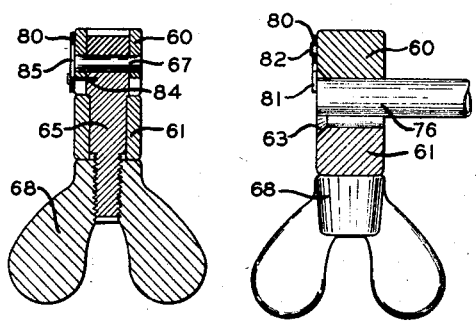
INVENTOR.
FRANK R. WILSON
BY
DES JARDINS, ROBINSON & KEISER
HIS ATTORNEYS

United States Patent Office 2,907,370
Patented Oct. 6, 1959

2,907,370

FLARING TOOL WITH AUTOMATIC GAUGING MEANS

Frank R. Wilson, Memphis, Tenn., assignor to Quinn Esther Wilson

Application October 5, 1953, Serial No. 384,302

9 Claims. (Cl. 153—79)

This invention relates to improvements in tube flaring tools and, more particularly, to improvements in gauges designed for use with hand-operated tube flaring tools to determine the extent to which the tube to be flared should be inserted in the clamping die to provide a flare of proper dimensions.

All of the prior art gauging devices for tube flaring tools with which I am familiar have been awkward and troublesome to use because of the special attention required on the part of the user of the tool in order to make proper use of the gauge. That is, with the known types of gauging devices the user of the tool is required to move the gauge to effective gauging position when the tube is inserted in the clamping die, after which the gauge must be moved away from the end of the tube so as to permit the flaring cone to be advanced into the end of the tube to be flared. With my novel gauging device, however, this independent manipulation of the gauge is no longer required since the gauge is operatively connected with the tube clamping means so that when the clamping die is opened, the gauge is moved into effective gauging position, and when the clamping die is closed, the gauge is moved out of position over the end of the tube so that the flaring cone may be advanced into the end of the tube. My gauge is, therefore, convenient to use and practical to incorporate in tube flaring tools since its operation is entirely automatic and no special attention on the part of the user of the tool is required.

Accordingly, it is an object of the present invention to provide an improved means for determining the extent to which the tube to be flared should be inserted in the flaring die of the flaring tool to provide a properly dimensioned flare.

Another object of the invention is to provide a gauge for tube flaring tools which is automatically controlled by the opening and closing of the clamping die, the gauge being moved into effective position when the die is opened, and out of effective position when the die is closed.

Another object of my invention is to provide novel means for causing the position of the gauge to be automatically controlled by the tube clamping means.

Another object of the invention is to provide a novel flare gauge for a tube clamping means of the rotary die type.

Another object of the invention is to provide a novel flare gauge for a tube clamping means of the bar type.

With these and other objects in view which will become apparent from the following description, the invention includes certain novel features of construction and combinations of parts, the essential elements of which are set forth in the appended claims and a preferred form or embodiment of which will hereinafter be described with reference to the drawings which accompany and form a part of this specfication.

In the drawings:

Fig. 1 is a side elevation of a hand-operated tube flaring tool in which there is shown incorporated a flare gauge embodying the principles of my invention.

Fig. 2 is a plan view of the tool shown in Fig. 1.

Fig. 3 is a plan view of the tube flaring tool showing the clamping means open and ready for the insertion of a tube and the gauge swung into effective position above the die opening.

Fig. 4 is a cross-sectional view taken along the line 4—4 of Fig. 3.

Fig. 5 is a plan view of a bar type clamping means in the open position with a flare gauge incorporating the teachings of my invention applied thereto.

Fig. 6 is a plan view of the clamping means showing the latter in its closed position with the gauge moved to its ineffective position.

Fig. 7 is a cross-sectional view taken along the line 7—7 of Fig. 6.

Fig. 8 is a cross-sectional view taken along the line 8—8 of Fig. 5.

Fig. 9 is a side elevation of a tube flaring tool showing the bar-type clamping means in closed position ready for a tube flaring operation.

For the purpose of providing a full and complete understanding of my invention, I have shown a flare gauge incorporating the principles of my invention applied to two different types of tube clamping means. In Figs. 1 to 4, inclusive, my novel form of gauge is shown applied to a rotary-die type clamping means, whereas in Figs. 5 to 9, inclusive, I have shown my gauge applied to a bar type clamping means of conventional design. Undoubtedly there are various other types of clamping means to which my invention might be applied with equal facility and with equally beneficial results. It is also to be realized that the herein disclosed embodiments are given by way of illustration only and are not intended to limit the scope of my invention to the exact structure shown since it is evident that the underlying principles of my invention might be applied to different arrangements and construction than those which I am about to describe. The true scope of my invention is to be determined from the claims appended hereto.

In the first embodiment of the invention, shown in Figs. 1 to 4, inclusive, I have shown my novel flare gauge applied to a hand-operated tube flaring tool of compact design in which a non-rotatable flaring cone 20 is internally threaded to receive the mating threads provided on the lower end of an advancing spindle 21 which is journaled for rotation without translation in the cross arm of a yoke 22. An operating handle 23 is fastened to the upper end of the spindle 21 for turning the spindle to advance the cone 20 into the end of the tube to be flared. The cone 20 is prevented from turning with the spindle by means of a pin 24 which is secured to the cone and projects into a longitudinally extending slot formed on the inner face of the one of the legs of the yoke 22.

The tube to be flared is adapted to be held beneath the flaring cone and in axial alignment therewith by a rotary die type of flaring means best shown in Fig. 3. This clamping means is identical with the tube clamping means shown in my co-pending application, Serial No. 274,403, for Tube Flaring Tool, filed March 1, 1952, now Patent No. 2,711,773, to which reference may be had for more particular details concerning the construction and novel features of this portion of the tool.

As shown in Fig. 3, a pair of clamping dies 29 and 30 are rotatable on axles 31 and 32, respectively, which are supported between the base plates 33 and 34. Each clamping die is in the form of an irregular polygon with semi-cylindrical clamping recesses formed in the faces thereof. The dies are retained between the spaced base plates 33 and 34 and, by rotating the dies about their respective axles, different sized clamping slots may be brought into position to form a tube clamping aperture of the proper size when the dies are brought together as shown in Fig. 2.

The base plates 33 are rigidly secured to the lower ends of the legs of the yoke 22 by means of bolts 38 and 39 which are provided with threaded tenons that screw into tapped holes provided in the bottoms of the legs of the yoke. The base plates 34 have welded thereto a U-shaped bracket 40 which is journaled on the bolt 38 and forms a pivot for the base plates 34 and the die 30 mounted therebetween. The base plates 34 are also formed with outwardly extending ears 41 which form a clamping abutment for the wing nut 42 on clamping bolt 43. As shown in Fig. 4, the bolt 43 at its inner end is mounted on a sleeve 44 which is journaled on a bushing 45 surrounding the bolt 39. When the clamping means is to be opened to permit the removal or insertion of a tube between the clamping dies, the bolt 43 is swung to the position shown in Fig. 3 to disengage the wing nut 42 from the ears 41 so that the base plate 34 and die 30 may be swung to the open position shown in this figure. After the tube has been inserted between the clamping dies, the dies are closed and the clamping bolt is swung to clamping position as shown in Fig. 2, after which the wing nut 42 is tightened to securely bolt the tube in place beneath the flaring cone.

It is usually desirable and often imperative that the flare formed on the end of the tube be properly dimensioned to comply with the standards set up for this sort of tubing. Accordingly, some means must be provided for assisting the user of the tool in determining how far to insert a piece of tubing such as that indicated by reference numeral 50 in Fig. 1 into the clamping aperture formed by the die. For this purpose, I have provided a gauge which is automatically moved into effective gauging position when the clamping means is opened, and moved out of the way, or to ineffective position, when the clamping means is closed. In this embodiment of the invention, the gauge comprises a blade 51 which lies adjacent the top face of the upper base plate 33 and is journaled at its inner end on the bushing 45 surrounding the bolt 39. Beyond the bushing, the blade is provided with a downwardly turned ear 52 which is slotted to embrace clamping bolt 43 as indicated in Fig. 4. Hence, as the bolt 43 is swung about the axis of the bolt 39, the gauge blade 51 will be moved into effective gauging position, as indicated in Fig. 3, when the bolt is swung to the unclamping position; and will be swung to an out of the way, or ineffective position as indicated in Fig. 2, when the clamping bolt 43 is in its die clamping position. Hence, when the dies are unclamped and swung apart as indicated in Fig. 3, the gauge blade 51 will be in position to stop insertion of the tube 50 after its upper end has made contact with the bottom face of the blade. The base plate 34 and die 30 are now swung to a closed position to clamp the tube after which the clamping bolt 43 is swung to the Fig. 2 position and the thumb screw 42 tightened so as to securely grip and hold the tube beneath the flaring cone 20. The blade 51 now will be swung to one side as shown in Fig. 2 so that the flaring cone may be forced down into the end of the tube by rotation of the operating handle 23. The handle 23 is turned until the flared portion of the tube is forced against the chamfer 54 provided on the upper end of each clamping recess 35. The depth of the chamfer 54 is, in general, proportional to the diameter of the clamping recess, that is, as the diameter of the recess increases, the depth of the chamfer 54 is likewise increased. Hence, a larger flare will be provided on the larger sizes of tubing than on the smaller. In this way, a correctly dimensioned flare will be provided on each size of tubing flared by the tool, it only being necessary for the user to insert the tubing until the upper end thereof contacts the lower face of the gauging blade 51 and to thereafter advance the cone into the tube until the flared portion of the tube is forced into contact with the face of the chamfer 54.

In Figs. 5 to 9, inclusive, of the drawings, I have shown how my invention may be applied to a bar type clamp of conventional design. As herein shown, the clamping means comprises a pair of elongated die blocks 60 and 61 each provided with a series of semicylindrical clamping recesses 62 of varying sizes for accommodating different sizes of tubing. Each recess is provided at its upper end with a chamfer 63 having a depth which, in general, is proportional to the diameter of the recess 62 so as to produce a flare of correct dimensions when the outside wall of the flared tube is forced against the chamfer. A pair of clamping bolts 64 and 65 is provided for clamping the die blocks tightly together to securely grip a tube disposed in one of the openings. The clamping bolts 64 and 65 are pivotally secured at 66 and 67, respectively, to the die block 60. The bolt 65 is arranged to be swung from an open, unclamped position shown in Fig. 5 to a closed or clamping position shown in Fig. 6, the shank of the bolt being received within a slot formed in the end of the die block 61 when it is swung to its clamping position. Each clamping bolt is provided with a wing nut 68 which may be tightened against the face of the die blocks 61 to draw the blocks together as shown in Fig. 6. The axis of the tube to be flared is then aligned with the axis of the flaring cone after which the cone is advanced into the tube to produce the desired flare.

A complete flaring tool with the clamping die in place is shown in Fig. 9, this tool being of the same type as the one previously shown and described. As shown herein, the tool comprises a flaring cone 70 provided with a threaded hole for receiving the threaded lower end of a spindle 71. The spindle 71 is mounted for rotation without translation in the cross arm of a yoke 72 and is provided at its upper end with an operating handle 73. The cone 70 is prevented from turning by a pin a 74 projecting from the cone which is received in a longitudinally extending slot formed in one of the legs of the yoke 72. Each leg of the yoke 72 is provided at its lower end with a foot 75 for supporting the clamping means comprised of die blocks 60 and 61. A tube 76 is shown clamped between the die blocks and disposed beneath the flaring cone 70 in readiness for advancement of the cone into the end of the tube.

To determine the extent to which the tube 76 should be inserted in the die opening formed by the recesses 62 in order to produce a properly dimensioned flare, I have provided a gauge on the clamping means arranged to be moved into and out of engaging position automatically in response to the clamping and unclamping of the die blocks. As herein illustrated, this gauge comprises a plate 80 on which a series of stop fingers 81 are provided as shown in Figs. 5 and 6. The plate 80 is arranged for longitudinal sliding movement on the top face of the die block 60 by means of a pair of headed pins 82 mounted in the die block which cooperate with slots 83 provided in the gauge plate to constrain the plate to longitudinal sliding movement across the top face of the die block. Sliding movement of the plate is controlled by a pin 84 mounted in the shank of the swing-bolt 65 to one side of the pivot 67. The pin 84 is received within a transverse slot 85 formed in the end of the gauge plate 80 adjacent the swing-bolt 65. Therefore, as the swing-bolt 65 is swung from its closed position shown in Fig. 6 to its open or unclamping position shown in Fig. 5 the gauge plate 80 will be moved to the right as viewed in Fig. 5 so as to bring the fingers 81 over the die openings provided by the clamping recesses 62. The fingers will thereby be in effective position to stop the upper end of the tube 76 when it is inserted in the die opening in the manner indicated in Fig. 8. The die blocks 60 and 61 are now brought together preparatory to clamping and the swing bolt 65 is swung to the Fig. 6 position in readiness for clamping whereupon the gauge plate 80 will be moved to the left so as to remove the stop fingers 81 from over the die openings as shown in Fig. 6. The wing nuts 68 are now tightened so as to securely clamp the tube 76 in place after which the flaring cone 70 may be advanced into the end of the tube to flare the same. Since the stop fingers 81 will limit the insertion of the tube to the extent indicated in Fig. 8, and since the chamfers 63 are made of proper depth to provide a flare of the proper dimensions when the flaring cone is driven all of the way home, the user of the tool may be assured that a properly dimensioned flare will result when the tool is used in the manner intended. Use of the tool is greatly facilitated by the automatic positioning of the flare gauge in dependence upon the swinging of the bolt 65 from its clamping to its unclamping position, and vice versa, since the flare gauge is thereby moved into and out of gauging position.

While I have described my invention in connection with two possible forms or embodiments thereof, and have used certain specific terms and language herein, it is to be understood that the present disclosure is illustrative rather than restrictive and that changes and modifications therein may be resorted to without departing from the spirit or scope of the claims which follow.

Having thus described my invention, what I claim as new and useful, and desire to secure by United States Letters Patent, is:

1. A tube flaring tool comprising a flaring cone, clamping means for holding the tube to be flared securely in place beneath the flaring cone, including separable clamping dies having clamping recesses formed therein, and a manually operable clamping device movable from a clamping position in which it may be manipulated to clamp said dies together to grip the tube tightly within the clamping recesses to an unclamping position in which the dies may be separated to permit removal of the tube, a gauge for determining the extent of insertion of the tube in the clamping dies, and means connecting said clamping device to said gauge whereby said gauge is caused to move into gauging position over the clamping recesses when said device is moved to its unclamping position, and is caused to move out of gauging position when said device is moved to its clamping position.

2. The tube flaring tool of claim 1 wherein said clamping device includes a swing-clamp movable from a clamping position in which the clamp may be tightened to draw said dies together to an unclamping position in which the dies are free to be opened, and vice-versa.

3. The tube flaring tool of claim 2 wherein said gauge includes a bar mounted for sliding movement into and out of gauging position over the clamping recesses, and connections between said bar and said swing-clamp for moving the bar into gauging position when the swing-clamp is swung to its unclamping position, and for moving it out of gauging position when the swing-clamp is swung to its clamping position.

4. A flare gauge for a tube flaring tool comprising separable clamping dies having clamping recesses for holding the tube to be flared, a swing-clamp settable to one position in which said clamp may be manipulated to draw said dies together to grip the tube tightly within the clamping recesses and to another position in which said dies are free to be opened, a stop bar arranged for movement across the top of at least one of said clamping dies, said bar having abutment means thereon for engaging the end of the tube when it is inserted in the dies to limit the length of the tube inserted therein, and means connecting said bar and said swing-clamp for conjoint movement to cause said abutment means to be moved out of effective position over the clamping recesses when said swing-clamp is turned to its clamping position, and to cause it to be moved to effective position over the recesses when the swing-clamp is turned to its unclamping position.

5. The flare gauge of claim 4 wherein said connecting means includes a pin and slot connection.

6. The flare gauge of claim 4 wherein said stop bar comprises a pivoted blade.

7. The flare gauge of claim 4 wherein said stop bar comprises a slidable plate.

8. A flare gauge for a tube forming tool comprising a pair of die blocks having clamping recesses therein for embracing the tube to be flared, means connecting said die blocks to enable said blocks to be opened and closed, a manipulable swing-clamp rockable from a clamping position in which it may be manipulated to draw said die blocks together and grip the tube tightly within the clamping recesses to an unclamping position in which the die blocks may be separated to permit removal of the tube, a stop engageable by the end of the tube when it is pushed into the die blocks to limit the length of tube inserted therein, and means including a connection to said swing-clamp for moving said stop out of effective position over the clamping recesses when said clamp is rocked to its clamping position, and for returning said stop to its effective position over the recesses when said clamp is rocked to its unclamping position.

9. A tube flaring tool comprising flaring means, gripping means for maintaining a tube to be flared securely in place and in desired spaced relation to said flaring means, said gripping means including a pair of separable tube engaging members, movable holding means operable in a first position thereof to hold said tube engaging means in gripping relation with a tube to be flared, said holding means movable to a second position to permit movement of said tube engaging members into release relation with said tube for removal or insertion thereof, gauging means for positioning a tube to be flared in predetermined relation with respect to said tube engaging members, and means mechanically connecting the gauging means directly to said holding means for conjoint movement therewith when moving said gauging means out of and into gauging position in response to the movement of said holding means into said first and second positions, respectively.

References Cited in the file of this patent

UNITED STATES PATENTS

| | | |
|---|---|---|
| 1,472,278 | Mueller | Oct. 30, 1923 |
| 1,578,696 | Wright | Mar. 30, 1926 |
| 1,921,281 | Carlson | Aug. 8, 1933 |
| 2,242,831 | McIntosh | May 20, 1941 |
| 2,543,480 | Vaill | Feb. 27, 1951 |
| 2,566,434 | Toth | Sept. 4, 1951 |

FOREIGN PATENTS

| | | |
|---|---|---|
| 570,093 | Great Britain | June 21, 1945 |